United States Patent [19]

Hsu et al.

[11] Patent Number: 5,303,996

[45] Date of Patent: Apr. 19, 1994

[54] CABLE RETENTION METHOD AND APPARATUS FOR MODULAR COMPUTER CABINETS AND THE LIKE

[75] Inventors: Sawyer C. Hsu; James Fratis, both of San Diego; Robert W. Fischer, Jr., Lakeside; Sidney L. Valentine, Poway; Carlo V. Daleo, San Diego, all of Calif.

[73] Assignee: NCR Corporation, Dayton, Ohio

[21] Appl. No.: 633,567

[22] Filed: Dec. 24, 1990

[51] Int. Cl.⁵ ............................................. A47B 88/00
[52] U.S. Cl. .................................. 312/328; 312/138.1; 312/199
[58] Field of Search ............... 312/223, 109, 199, 277, 312/316, 328, 216, 210, 137, 138.1

[56] References Cited

U.S. PATENT DOCUMENTS

| | | | |
|---|---|---|---|
| 705,132 | 7/1902 | Phillips | 312/323 |
| 3,516,719 | 6/1970 | Weisblat | 312/216 |
| 4,679,123 | 7/1987 | Young | 361/428 |
| 4,915,460 | 4/1990 | Nook et al. | 312/216 |
| 4,957,333 | 8/1990 | Hsu et al. | 312/108 |

OTHER PUBLICATIONS

"Wire Retainer", by E. L. Dombroski, IBM Technical Disclosure Bulletin, vol. 22, No. 6, pp. 2348-2349, Nov. 1979.
"Wire Holder with Quarter-Turn Mounting," by E. L. Dombroski, IBM Technical Disclosure Bulletin, vol. 22, No. 8A, pp. 3310-3311, Jan. 1980.
"Flat Ribbon Cable Retention" by R. L. Raimondi, IBM Technical Disclosure Bulletin, vol. 17, No. 11, pp. 3375-3376, Apr. 1975.

Primary Examiner—Kenneth J. Dorner
Assistant Examiner—Gerald Anderson
Attorney, Agent, or Firm—Jack R. Penrod

[57] ABSTRACT

A cable or wire (information bus, power supply, etc.) retention method and apparatus for modular computer cabinets and the like in which the cabinet frame end walls have notch-like voids. The preferred embodiment for a cable retainer has a frame member with two cantilever portions, which frame member is spot-welded to several struts at other (non-cantilever) portions. The top and bottom struts protrude the frame member, and are longer than the distance between the cabinet end walls. The cable retainer is connected to the cabinet by inserting one pivoting strut tip into a receiving hole and causing the cantilever portion nearest the receiving hole to deform (causing deeper penetration of the inserted tip) so that a clearance is obtained between the other pivot end and its corresponding receiving hole, prior to releasing the cable retainer. Insertion is completed by pivoting the cable retainer to an upright position to latch the latching ends in cabinet end wall grooves.

18 Claims, 4 Drawing Sheets

CABLE RETENTION METHOD AND APPARATUS FOR MODULAR COMPUTER CABINETS AND THE LIKE

BACKGROUND OF THE INVENTION

The present invention generally relates to cable and wire retention. More particularly, the present invention relates to cable and wire retention for modular computer systems and the like.

A modular computer system is one in which more than one cabinet contains the elements of the system. Numerous interconnect cables and wires representing information and power supply buses electrically connect the cabinets (or modules). The sheer size and number of the interconnect cables often lead to protrusions which are unsightly and pose safety problems to passers-by.

One prior art solution to the above problems is to locate the computer system on top of a raised floor area so that the interconnect cables do not rest upon or extend into commonly used walkways. While this may eliminate the safety hazard for passers-by, it often does not improve the appearance of the system (the numerous unsightly cables still protrude from the cabinets and are in view). Additionally, the cables in prior computer systems frequently become tangled.

U.S Pat. No. 4,957,333, which is assigned to NCR Corporation—the assignee of the present letters patent—describes a solution to the above-mentioned problem by constructing the modular cabinet frame end walls with notch-like voids. The notches, preferably on the rear side of the cabinets are nearly fully enclosed, save a small opening (to preserve structural integrity) through which the cables may enter. The openings are covered by closure members and decorative trims once the cable is in place. The result is a modular computer system without unsightly wires, and in which the modules may be easily and quickly inserted or removed without the need for dismantling the cable attached to the backs of the other modules.

It is desireable to have decorative trims or cable retainers in such a system, in which the cable retainers are easily insertable and removeable.

SUMMARY OF THE INVENTION

To that end, it is an object of the present invention to provide a cable retention method and apparatus for computer cabinets and the like in which the cable retainers are easily attachable and detachable to the computer cabinets.

It is also an object of the present invention provide a cable retention method and apparatus for computer cabinets and the like in which the cable retainers are attachable and detachable without the use of tools.

It is another object of the present invention to implement such a method and apparatus in a modular computer system.

It is yet another object of the present invention to provide a cable retention method and apparatus for computer cabinets and the like in which attachment and detachment of the cable retainers requires little time.

There is provided in accordance with the present invention, a cable retention apparatus for retaining interconnect cables in a void of a cabinet. The cable retention apparatus includes, but is not limited to:

a frame member;

a pivoting member connected to the frame member having first and second pivot ends, the pivot ends for insertion into first and second pivot holes in the cabinet; and at least a latching member connected to the frame member for latching the cable retention apparatus to the cabinet;

wherein the frame member is pivoted around the pivot ends to facilitate ingress and egress of the interconnect cables.

The above-mentioned cabinet is also a module, which when connectedly arranged with other modules, forms a modular computer system having its interconnect cables efficiently retained.

The above and other objects, features, and advantages of the present invention will become apparent from the following description with reference to the attached drawings.

DETAILED DESCRIPTION OF THE PREFERRED EMBODIMENT

Figure 1:
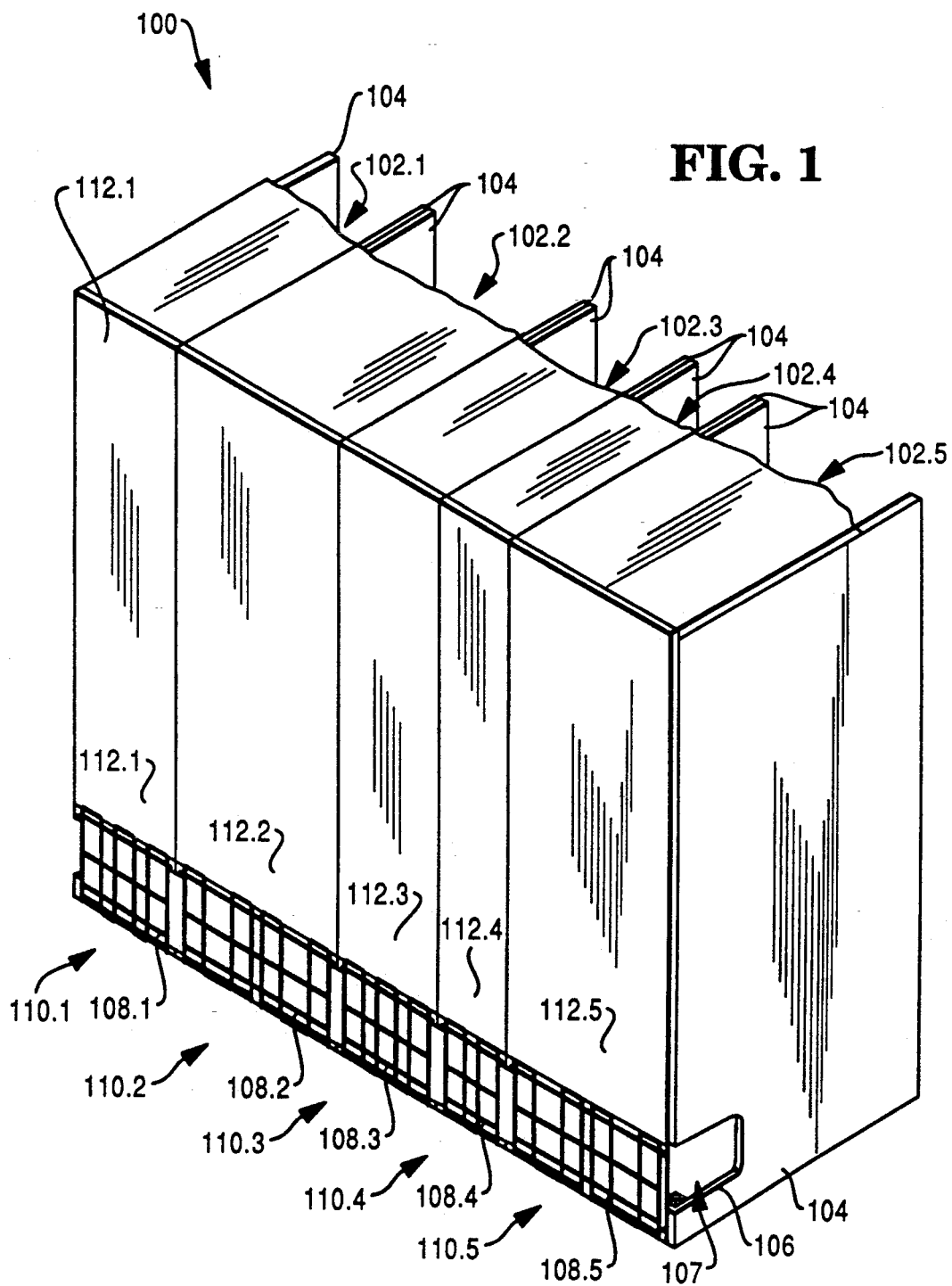
FIG. 1 is a rear perspective view of a modular computer system which employs the cable retention scheme of the present invention, and with the cable retainers fully attached.

Referring now to FIG. 1, a modular computer system 100 is shown. A number of computer cabinets or modules 102.1–102.5 are physically attached, and have electrical interconnect cables (not shown in FIG. 1) spanning the collective width of the system 100. Each of the modules 102.1–102.5 has two frame end walls 104 made of metal in the preferred embodiment. Each frame end wall 104 has a notch or hollow 106 which serves to substantially define a cable carrying apparatus 107, which extends across the bottom rear of the modules 102.1–102.5, and which is discussed in more detail in the aforementioned U.S. Patent, hereby expressly incorporated by reference. Finally, cable retaining grilles or cable retainers 108.1–108.5 decoratively cover module openings 110.1–110.5 in rear walls 112.1–112.5 to the modules 102.1–102.5. The openings 110.1–110.5 extend between the notches or cutouts 106. Thus it is shown that the cables become partially concealed when placed in the notches and retained by the cable retainers 108.1–108.5.

Figure 2:
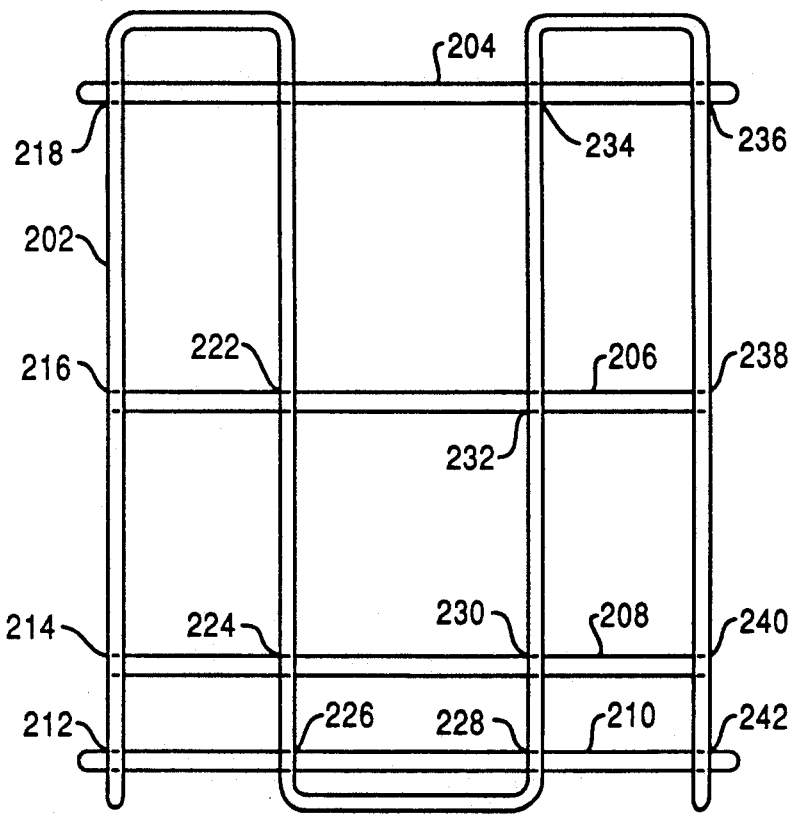
FIG. 2 is a front view of a cable retainer of the present invention.
Figure 3:
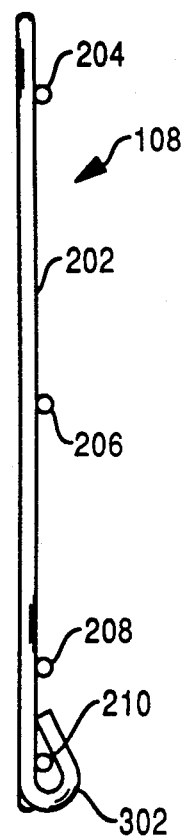
FIG. 3 is a side view of the cable retainer of the present invention.

Turning to FIG. 2, a cable retainer 108 is shown. All members shown have the same cross-section area, although this needn't be the case. The cable retainer 108 is essentially a frame member 202 selectively spot-welded to four struts 204, 206, 208 and 210. The ends or elbows 302 (best seen in FIG. 3) of the frame member 202 are curvedly formed around the strut 210 at points 212 and 242, and are free of weld. The opposite side of the strut 210 is spot-welded at points 226 and 228 to the frame member 202.

The strut 208 is spot-welded to the frame member 202 at points 224 and 230, but is free of weld at points 214 and 240. Similarly, the strut 206 is spot-welded to the frame member 202 at points 222 and 232, but is free of weld at points 216 and 238. The strut 204 is spot-welded at all of the points 218, 220, 234 and 236, to the frame member 202. This configuration allows for resilient, cantilever-type motion of the frame member 202 from the elbow 302 to the point 218 on one side of the frame member, and from the elbow 302 to point 236 on the other side of the frame member.

Figure 4:
FIG. 4 is a partial rear cross-sectional view of a modular cabinet with its pivot holes revealed.

Struts 204 and 210 are longer than the other struts, so that the ends of the aforementioned struts serve as latching members (or latching ends) and pivot members (or pivot ends), respectively. The pivot ends of the strut 210 match loose-fitting pivot holes 402 at the bottom of frame end walls 104 (seen in FIG. 4), which pivot holes are aligned in the preferred embodiment. The distance between the pivot holes 402 of a cabinet 102 is less than the length of the strut 210, so that the cable retainer 108 becomes secured to the cabinet once each pivot end is inserted into its corresponding pivot hole.

The cable retainer 108 is inserted into a cabinet 102 by first inserting one of the pivot ends of the strut 210 into a pivot hole 402 (the left side in FIG. 2, for example). The pivot end already inserted is pushed further into the pivot hole by pulling the cable retainer toward the pivot hole already having a pivot end inserted, which causes the cantilever-type deformation of the frame member 202, as previously mentioned. This is accomplished by grabbing the cable retainer 108 near struts 208 or 210 at either of the non-cantilever portions (i.e., near points 224, 226, 228 or 230), and squeezing until the pivot end on the right side of the strut 210 clears its corresponding pivot hole 402. Once the clearance is obtained, the right-hand-side pivot end is aligned with its pivot hole, and the cable retainer is released, so that the right side pivot end now inserts into the right side pivot hole. The cable retainer 108 is now pivotally connected at the pivot holes 402.

Figure 5:
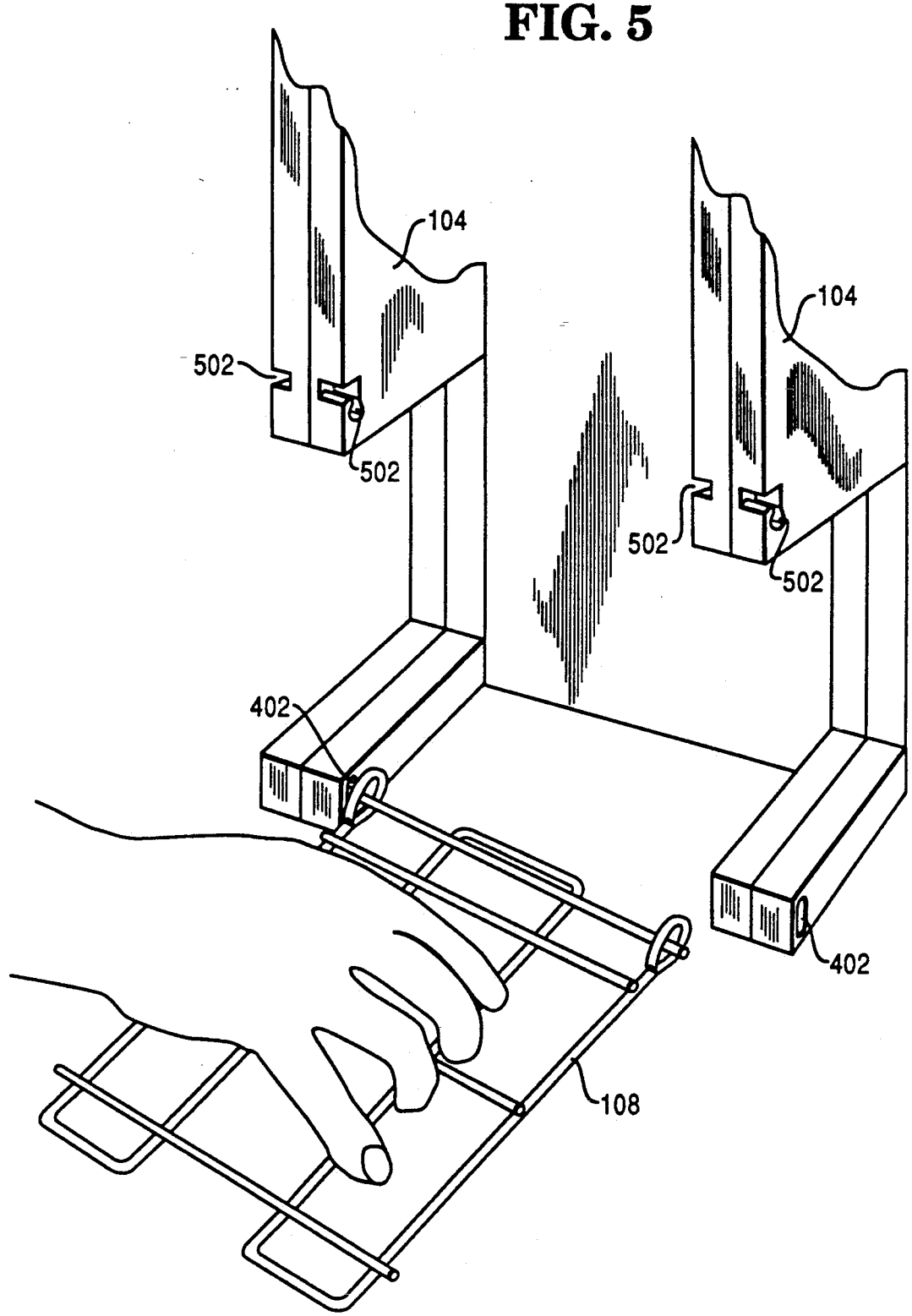
FIG. 5 is a rear cutaway perspective view of the modular computer system employing the cable retention scheme of the present invention, and with the cable retainers only partially attached.
Figure 6:
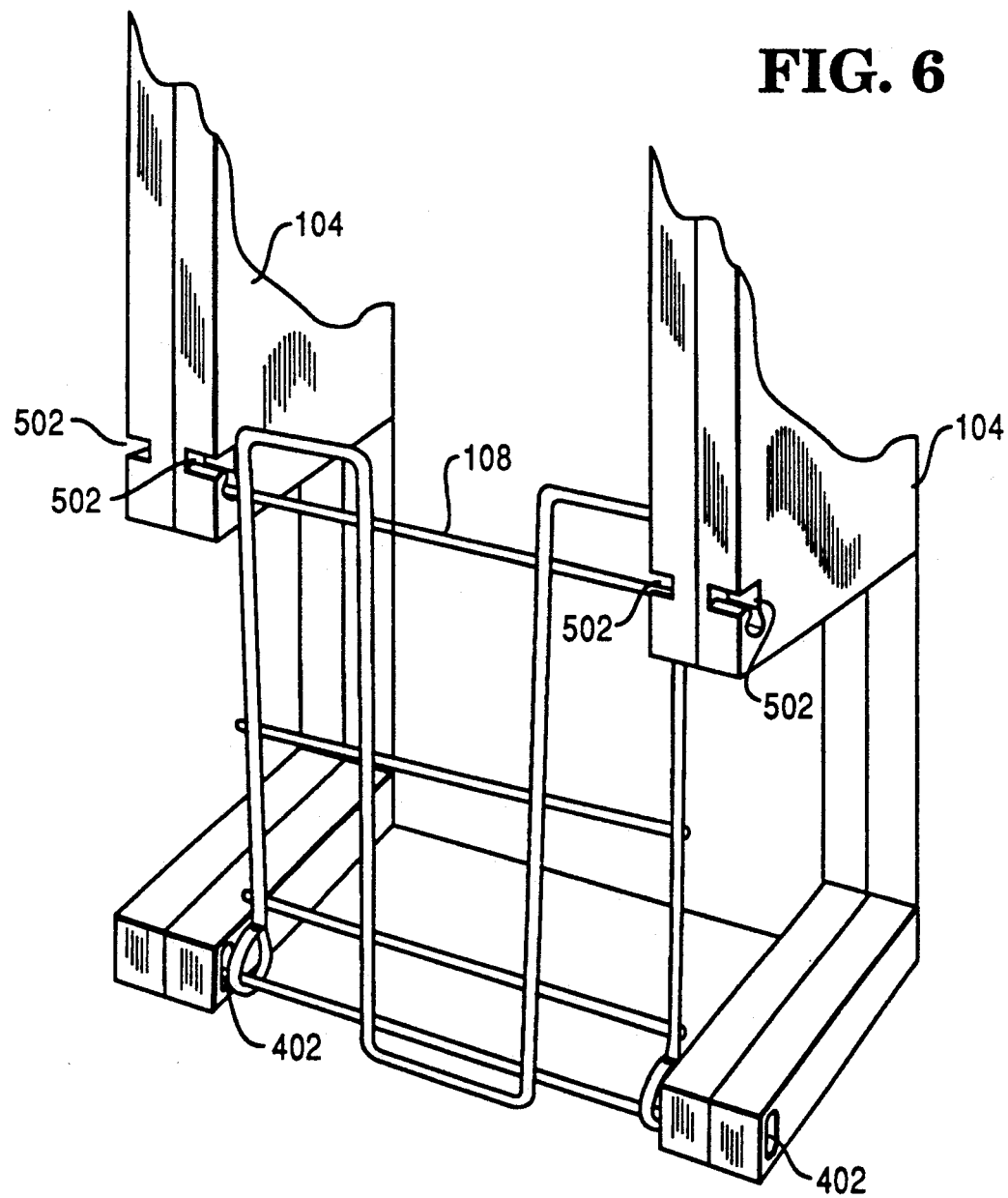
FIG. 6 is a rear cutaway perspective view of the modular computer system employing the cable retention scheme of the present invention, and with the cable retainers fully attached.

Referring to FIG. 5, the cable retainer 108 is pivoted around its pivot ends until the latching ends of the strut 204 are nearly aligned with (slightly lower than) the openings of the grooves 502. Alignment of the latching ends with the openings of the grooves 502 requires slightly vertically raising the cable retainer 108, once the cable retainer is rotated to the vertical plane. The clearance between the pivot ends and the pivot holes is sufficient for this operation. While the latching ends and the openings to the grooves 502 are aligned, the latching ends are inserted into the openings and pushed toward the back of the grooves. When the latching ends reach the back of the grooves 502, the cable retainer 108 is released, allowing gravity to cause a small translational movement of the entire cable retainer, thus engaging the latching ends of the strut 204 with the bottom portions of the grooves 502. The cable retainer 108 is now latched into place.

Removal of the cable retainer 108 from a cabinet is accomplished by reversing the above procedure.

Thus, a cable retention apparatus and method for insertion and removal of the apparatus have been disclosed, whereby insertion or removal can be effected in only seconds.

Variations and modifications to the present invention are possible given the above disclosure. However, variations and modifications which are obvious to those skilled in the art are intended to be within the scope of this letters patent.

We claim:

1. A cable retention apparatus for retaining interconnect cables in a void of a cabinet, said cabinet having a first receiving hole and a second receiving hole, said cable retention apparatus comprising:

a frame member having at least a first resilient cantilever position; and at least a first strut connected to at least a point of said frame member, but not on said cantilever portion, said first strut protruding from said frame member;

said first strut terminating at a first tip and a second tip thereof;

wherein insertion of said cable retention apparatus is effected by inserting said first tip of said first strut into said first receiving hole in said cabinet, and applying pressure substantially normal to said first receiving hole upon said frame member at a point other than said cantilever portion to provide a clearance for said second tip of said first strut to fit into said second receiving hole in said cabinet, and releasing said frame member.

2. The cable retention apparatus in claim 1 further comprising:

a second strut connected to at least a second point of said frame member, said second strut protruding said frame member;

said second strut terminating at a first tip and a second tip thereof;

wherein said first and second tips of said second strut serve as latch members to facilitate latching said cable retention apparatus to said cabinet.

3. The cable retention apparatus in claim 2 wherein said first and second struts are located near opposite ends of said frame member.

4. The cable retention apparatus in claim 2 wherein said first and second struts each connect to said frame member at a plurality of points.

5. The cable retention apparatus in claim 2 wherein a connection point between said frame member and said second strut defines a fixed end of said first resilient cantilever portion.

6. The cable retention apparatus in claim 1 wherein said first strut connects to said frame member at a plurality of points.

7. The cable retention apparatus in claim 1 wherein said frame member further comprises a second resilient cantilever portion, said second resilient cantilever portion located on a side of said frame member opposite said first resilient cantilever portion, and allowing insertion of said cable retention apparatus to start at either side of said frame member.

8. The cable retention apparatus in claim 7 wherein connection points between said frame member and said second strut define fixed ends of said first and second resilient cantilever portions.

9. The cable retention apparatus in claim 1 further comprising:

a second strut connected to at least a second point of said frame member, said second strut protruding said frame member;

said second strut terminating at a first tip and a second tip thereof; and a second resilient cantilever portion, said second resilient cantilever portion located on a side of said frame member opposite said first resilient cantilever portion, and allowing insertion of said cable retention apparatus to start at either side of said frame member;

wherein said first and second tips of said second strut serve as latch members to facilitate latching said cable retention apparatus to said cabinet, and connection points between said frame member and said second strut define the fixed ends of said first and second resilient cantilever portions.

10. A modular cabinet cluster comprising a plurality of cabinets, each said cabinet comprising an insertable and removeable cable retention apparatus for retaining interconnect cables in a void of said cabinet and having first and second receiving holes therein, said cable retention apparatus comprising:

a frame member having at least a first resilient cantilever portion; and at least a first strut connected to at least a point of said frame member, but not on sad cantilever portion, said first strut protruding from said frame member and terminating at first and second tips thereof;

wherein insertion of said cable retention apparatus is effected by inserting said first tip of said first strut into said first receiving hole in said cabinet, and applying pressure substantially normal to said first receiving hole upon said frame member at a point other than said cantilever portion to provide a clearance for said second tip of said first strut to fit into said second receiving hole in said cabinet, and releasing said frame member.

11. The modular cabinet cluster of claim 10 wherein said cable retention apparatus further comprises:

a second strut connected to at least a second point of said frame member, said second strut protruding said frame member and terminating at first and second tips thereof;

wherein said first and second tips of said second strut serve as latch members to facilitate latching said cable retention apparatus to said cabinet.

12. The modular cabinet cluster in claim 11 wherein said first and second struts are located near opposite ends of said frame member.

13. The modular cabinet cluster in claim 11 wherein said first and second struts each connect to said frame member at a plurality of points.

14. The modular cabinet cluster in claim 11 wherein said frame member and said second strut are fastened together at a first common point and this first common point defines a fixed end of said first resilient cantilever portion.

15. The modular cabinet cluster in claim 10 wherein said frame member further comprises a second resilient cantilever portion, said second resilient cantilever portion located on a side of said frame member opposite said first resilient cantilever portion, and allowing insertion of said cable retention apparatus to start at either side of said frame member.

16. The modular cabinet cluster in claim 15 wherein said frame member and said second strut are fastened together at a second common point opposite to said first common point and this second common point defines a fixed end of said second resilient cantilever portion.

17. The modular cabinet cluster in claim 10 wherein said first strut connects to said frame member at a plurality of points.

18. The modular cabinet cluster in claim 10 wherein said cable retention apparatus further comprises:

a second strut connected to at least a second point of said frame member, said second strut protruding from said frame member and terminating at first and second tips thereof; and a second resilient cantilever portion, said second resilient cantilever portion located on a side of said frame member opposite said first resilient cantilever portion, and allowing insertion of said cable retention apparatus to start at either side of said frame member;

wherein said first and second tips of said second strut serve as latch members to facilitate latching said cable retention apparatus to said cabinet, and said connection points between said frame member and second strut define fixed ends of said first and second resilient cantilever portions.

* * * * *